United States Patent
Thuma et al.

(10) Patent No.: US 9,840,265 B1
(45) Date of Patent: Dec. 12, 2017

(54) NESTED LUGGAGE CART

(71) Applicant: Suncast Technologies, LLC, Palm Beach Gardens, FL (US)

(72) Inventors: Michael Thuma, LaGrange, IL (US); Torrence Anderson, Overland Park, KS (US); Michael R. Vogler, Oswego, IL (US)

(73) Assignee: Suncast Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 15/285,636

(22) Filed: Oct. 5, 2016

(51) Int. Cl.
*B62B 3/14* (2006.01)
*B62B 3/10* (2006.01)
*B62B 3/00* (2006.01)

(52) U.S. Cl.
CPC ............ *B62B 3/1476* (2013.01); *B62B 3/001* (2013.01); *B62B 3/106* (2013.01); *B62B 2202/24* (2013.01); *B62B 2202/48* (2013.01); *B62B 2202/65* (2013.01); *B62B 2301/04* (2013.01)

(58) Field of Classification Search
CPC ..... B62B 3/1476; B62B 2202/24; B62B 3/14; B62B 3/1472
See application file for complete search history.

(56) References Cited

U.S. PATENT DOCUMENTS

| | | | |
|---|---|---|---|
| 2,764,419 A | 9/1956 | Enders | |
| 2,818,267 A * | 12/1957 | Watson | B62B 3/1476 280/33.997 |
| 2,992,010 A * | 7/1961 | Sides | B62B 3/1476 280/33.997 |
| 3,046,033 A | 7/1962 | Andersen et al. | |
| 3,224,787 A | 12/1965 | Andersen | |
| 3,813,111 A | 5/1974 | Ruger | |
| 4,733,877 A | 5/1988 | Pastien | |
| D318,550 S | 7/1991 | Stefano | |
| 5,149,114 A | 9/1992 | Lewandowski et al. | |
| 5,203,579 A * | 4/1993 | Lipschitz | B62B 3/1472 248/129 |
| 5,409,245 A * | 4/1995 | Kern | B62B 3/1476 280/33.996 |
| 5,526,916 A | 6/1996 | Amdahl et al. | |
| 6,125,985 A | 10/2000 | Amdahl et al. | |
| 6,203,029 B1 | 3/2001 | Ondrasik | |

(Continued)

FOREIGN PATENT DOCUMENTS

EP 0430058 6/1991

*Primary Examiner* — Brian L Swenson
(74) *Attorney, Agent, or Firm* — McHale & Slavin, P.A.

(57) ABSTRACT

A cart for transporting goods to various locations. The cart is configured to carry luggage and other items that require transportation, and designed to nest with like-constructed carts, thereby reducing the space required to store the carts when not in use. The cart comprises a platform configured to carry a load. The platform has a first end configured to nest within a like-shaped cart, a second end configured to receive and engage with at least a portion of said like-shaped cart, and opposing sides. The cart further includes a pair of push or pull handles having first ends secured to the first end of the platform and second ends secured to the second end of the platform, and a main body traversing between the first end and the second end. The cart also includes a plurality of wheels attached to a lower surface of the platform.

18 Claims, 14 Drawing Sheets

(56) References Cited

U.S. PATENT DOCUMENTS

| | | | |
|---|---|---|---|
| 6,260,863 B1* | 7/2001 | Orozco | B60B 33/00 |
| | | | 280/33.997 |
| 6,860,493 B2 | 3/2005 | Orozco | |
| 7,219,904 B1* | 5/2007 | Boom | B62B 3/04 |
| | | | 280/47.35 |
| 7,798,501 B1* | 9/2010 | Hopkins | B62B 3/04 |
| | | | 280/47.34 |
| 8,733,765 B2 | 5/2014 | Padgett et al. | |
| 8,820,777 B1* | 9/2014 | Pargansky | B62B 3/022 |
| | | | 280/651 |
| 2003/0205873 A1 | 11/2003 | Orozco | |
| 2005/0040614 A1 | 2/2005 | Johnson et al. | |
| 2008/0084039 A1* | 4/2008 | Moulton | A45C 13/385 |
| | | | 280/47.35 |
| 2012/0235386 A1* | 9/2012 | Grundvig | B62B 3/12 |
| | | | 280/651 |

* cited by examiner

NESTED LUGGAGE CART

FIELD OF THE INVENTION

The present invention is directed to a device for transporting goods to various locations; to a cart designed to reduce the amount of space required for storing the cart; and more particularity, to a cart designed to carry luggage and other items that require transportation configured to nest with like-constructed carts, thereby reducing the space required to store the carts when not in use.

BACKGROUND OF THE INVENTION

Travel, and its corresponding tourism revenues, provides large economic benefits for many countries around the world. As traveling becomes more accessible and even cheaper for the average person, individuals continue to take trips away from their homes in large numbers. Whether traveling by plane, car, or cruise ship, most travel requires individuals to stay in an establishment that provides housing accommodations. Whether a hotel room, ship cabin, or a rented house, these accommodations allow the traveler to store their clothes and other personal belongings in a secure location while they are exploring their chosen destination.

Upon arriving at his/her destination, a traveler requires checking into the living accommodations. This process requires transporting luggage and other personnel belongings from their car to their room. Typically, the traveler unpacks his/her luggage and other personal belongings from the car and loads the luggage and other personnel belongings onto a luggage cart. Whether the individual traveler performs this procedure or hotel personnel are responsible, utilization of the luggage cart makes transporting such items easier and quicker, and reduces the risk of injury from carrying heavy items.

While luggage carts are a tremendous help in moving luggage and other personnel belongings to a traveler's room, the function of these carts, i.e. transportation of large items, often require them to take up a large amount of space. In addition, because hotels do not want their guests to be waiting in the lobby area, they often utilize a large number of the luggage carts. This is particularly true for large resort areas that have a large amount of guests coming and going at any given time. One of the problems with having a large number of these carts is finding a space large enough to store them. As the luggage carts are stored in a back to back or side to side orientation, the storage area must be big enough to accommodate such storage orientations. Even in hotels that do not require having large numbers of the carts, storage of even two units can require more space than desired.

What is needed in the art is a luggage cart configured to nest with like-constructed carts, thereby reducing the space required to store the carts when not in use.

U.S. Pat. No. 8,733,765 describes an airport cart adapted for carrying carry-on luggage and personal items divested prior to a security check point. The cart is described as including a lower luggage tray or shelf and a pair of vertical supports which extend upward from a rear portion of this tray or a horizontal portion of the cart frame. The cart may have dual handles extending rearward in a spaced-apart manner from the vertical supports, such that the handles are parallel to each other and do not block vertical loading of the luggage tray. The cart includes one, two, or more storage or security screening bins that are fixed to or detachably mounted on the vertical supports or the handles. One or more of the storage bins may be compatible with conventional airport screening bins. The bins are horizontally offset from the luggage tray and each other to facilitate unobstructed 3-D screening of bags and items in the bins.

U.S. Pat. No. 6,860,493 teaches a nestable cart described as having a base or platform supported on caster wheels and sides which taper inwardly from the rear end to the front end of the platform. An upwardly extending handle frame extends upwardly from the rear end of the cart. An open area beneath the platform is designed to receive the front end of a platform of a second cart in order to nest two carts together. A nesting guide formation is provided at one end of the platform to guide two platforms into nesting engagement while lifting the rear wheels of a front cart from the ground during nesting of a rear cart into the front cart. The guide formation may be one or more rotating members such as rollers or guide wheels.

U.S. Pat. No. 6,203,029 teaches a flat bed cart described as having a flat, wheeled platform with a front end and a rear end, and an upwardly extending handle frame extending upwardly from the rear end of the platform. The platform has a forward, fixed deck portion and a rear, liftable deck portion having a forward end hinged to the fixed deck portion for rotation about a first horizontal hinge axis extending transverse to the longitudinal axis of the platform. The rear deck portion is movable between a first position co-planar with the forward deck portion for use in transporting items supported on the platform, and a second, raised position when another cart is nested into the rear end of the platform.

U.S. Pat. No. 2,764,419 teaches a light, rigid cart structure described as being suitable for transporting luggage about in a railway or bus station, the cart structure being designed to facilitate nesting relation between carts of similar construction, whereby a minimum amount of area is required for parking or storing the devices.

SUMMARY OF THE INVENTION

The present invention is related to a cart for transporting goods to various locations. The cart is designed to reduce the amount of space required for storing the cart. More particularly, the cart is configured to carry luggage and other items that require transportation, and designed to nest with like-constructed carts, thereby reducing the space required to store the carts when not in use. As an illustrative example, the cart may comprise a platform configured to carry a load. The platform has a first end configured to nest within a like-shaped cart, a second end configured to receive and engage with at least a portion of said like-shaped cart, and opposing sides. The cart further includes a first push or pull handle having a first end secured to the first end of the platform, a second end secured to the second end of said platform, and a main body traversing between the first end and the second end. A second push or pull handle has a first end secured to the first end of the platform, a second end secured to the second end of the platform, and a main body traversing between the first end and the second end. The second push or pull handle is spaced apart from said first push or pull handle. The cart also includes a plurality of wheels attached to a lower surface of the platform.

Accordingly, it is an objective of the invention to provide a cart which is configured to minimize the amount of space required to store multiple, like-shaped carts.

It is an objective of the invention to provide a cart which is nestable with one or more like-shaped carts.

It is a further objective of the invention to provide a cart that includes a platform configured to receive and secure one or more like-shaped carts in a nested configuration.

It is yet another objective of the invention to provide a cart that contains multiple push/pull bars configured to aid in nesting.

It is a still further objective of the invention to provide a luggage cart which is configured to minimize the amount of space required to store multiple, like-shaped luggage carts.

It is an objective of the invention to provide a luggage cart which is nestable with one or more like-shaped luggage carts.

It is a further objective of the invention to provide a luggage cart that includes a platform configured to receive and secure one or more like-shaped luggage carts in a nested configuration.

It is yet another objective of the invention to provide a luggage cart that contains multiple push/pull bars configured to aid in nesting.

Objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
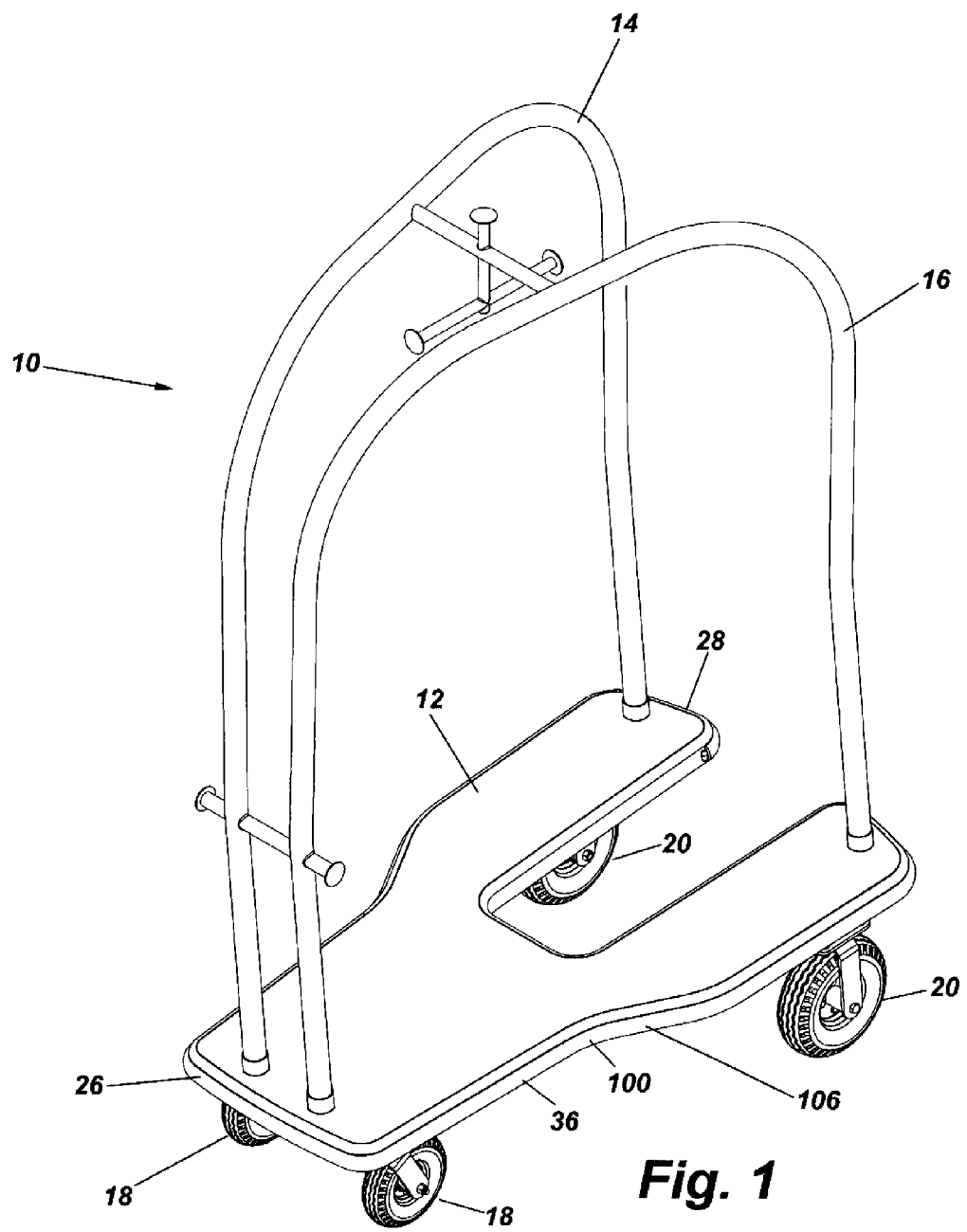
FIG. 1 is a perspective view of an illustrative embodiment of a nestable luggage cart.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

As shown in FIGS. 1-10, the disclosed invention is a commercial grade cart for transporting luggage and other personal goods, referred to generally as a luggage cart 10. The luggage cart 10 includes a base or platform 12, a first push/pull handle 14, and a second push/pull handle 16. The platform 12 is carried on a plurality of wheels, a first wheel set 18 and a second wheel set 20. The base or platform 12 is configured to receive and transport a load, such as a load from supporting one or more item, such as luggage, placed thereon. While the present invention is described as a cart for transporting luggage, transportation of luggage is not the only intended use. Other large or small items, such as boxes, clothes, grocery items, tools, or any other item or goods that can fit and remain on the platform 12 may be transported. The platform 12 is also configured to aid in nesting like-shaped luggage carts 10.

Figure 2:
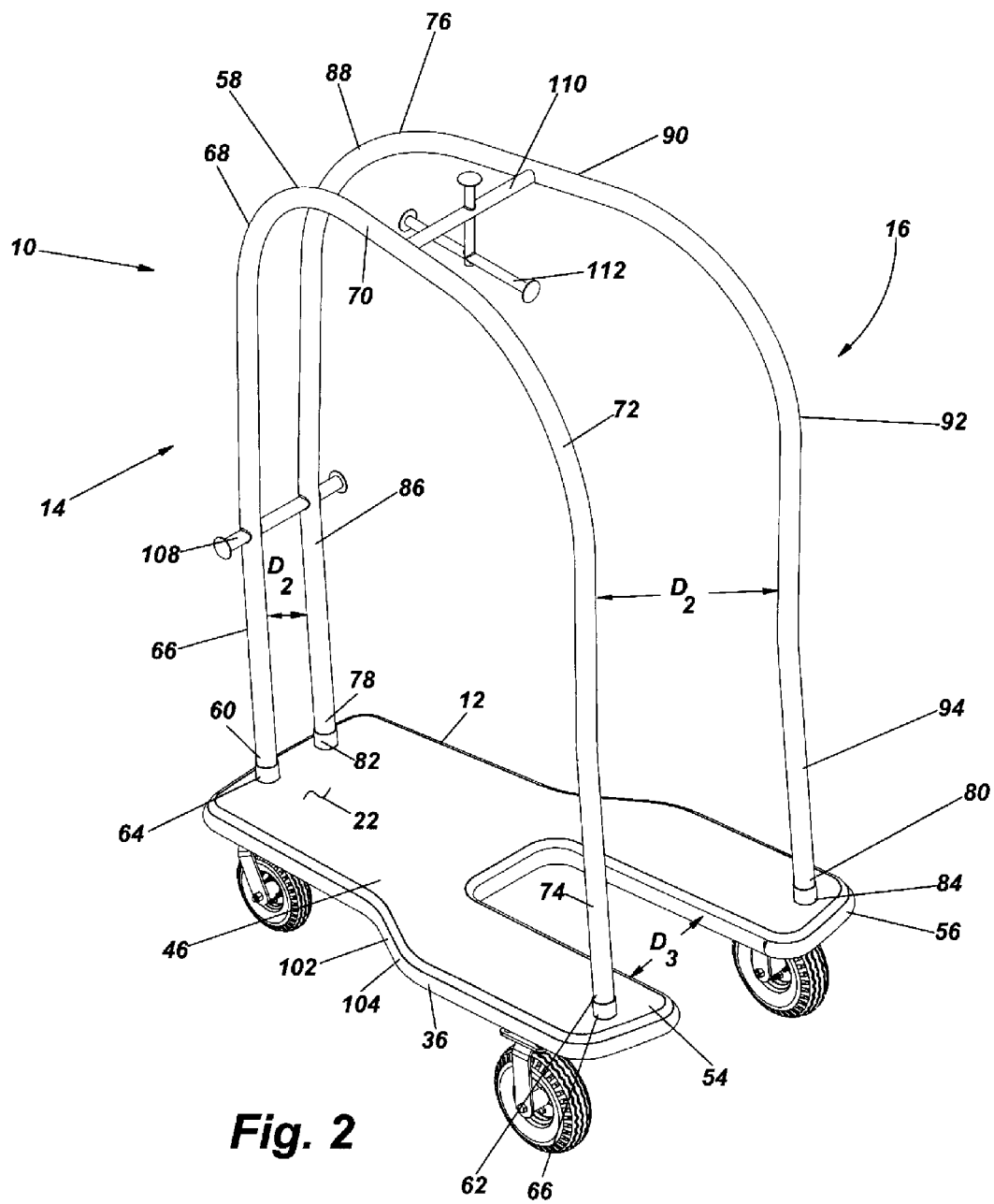
FIG. 2 is an alternative perspective view of the nestable luggage cart.
Figure 3:
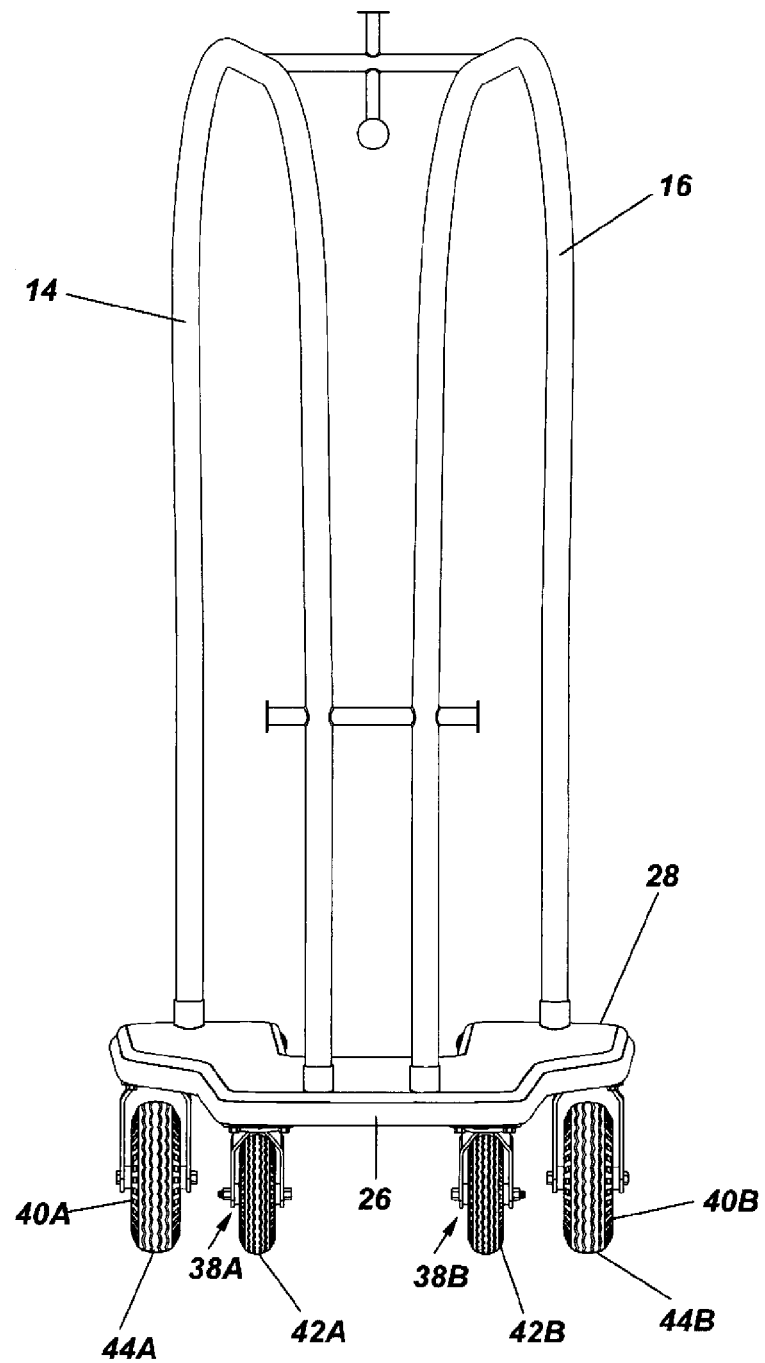
FIG. 3 is a front view of the nestable luggage cart.
Figure 4:
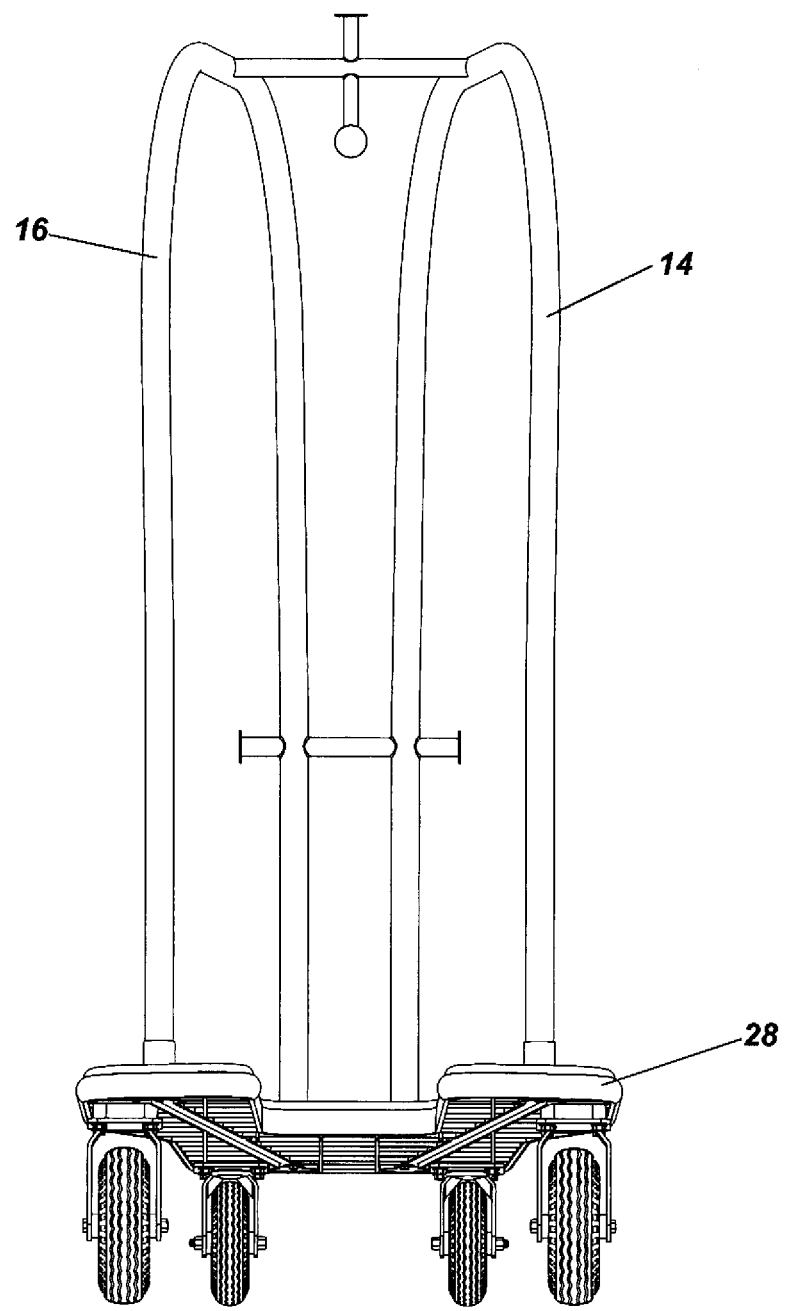
FIG. 4 is a back view of the nestable luggage cart.
Figure 5:
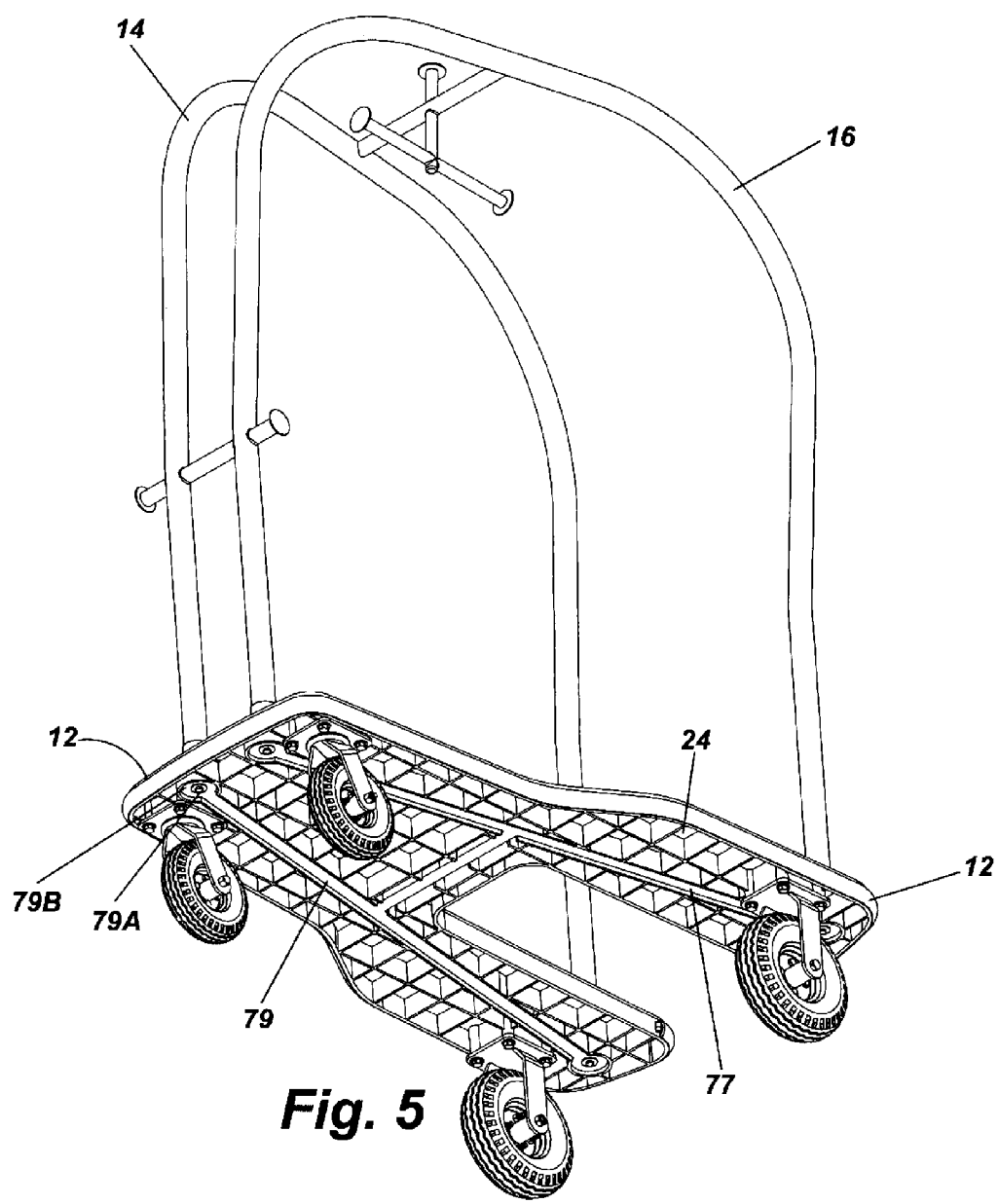
FIG. 5 is a bottom perspective view of the nestable luggage cart.
Figure 6:
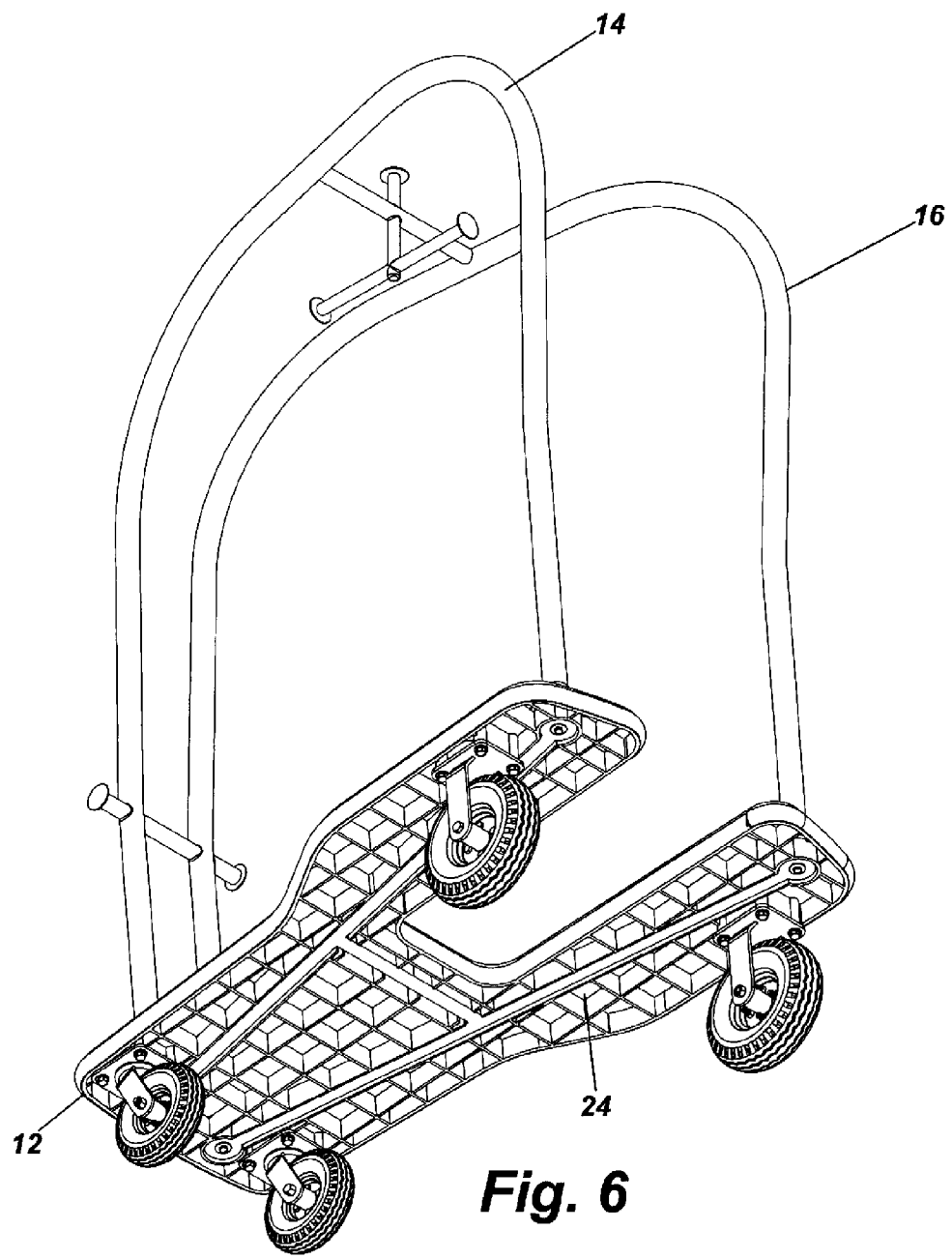
FIG. 6 is an alternative bottom perspective view of the nestable luggage cart.
Figure 7:
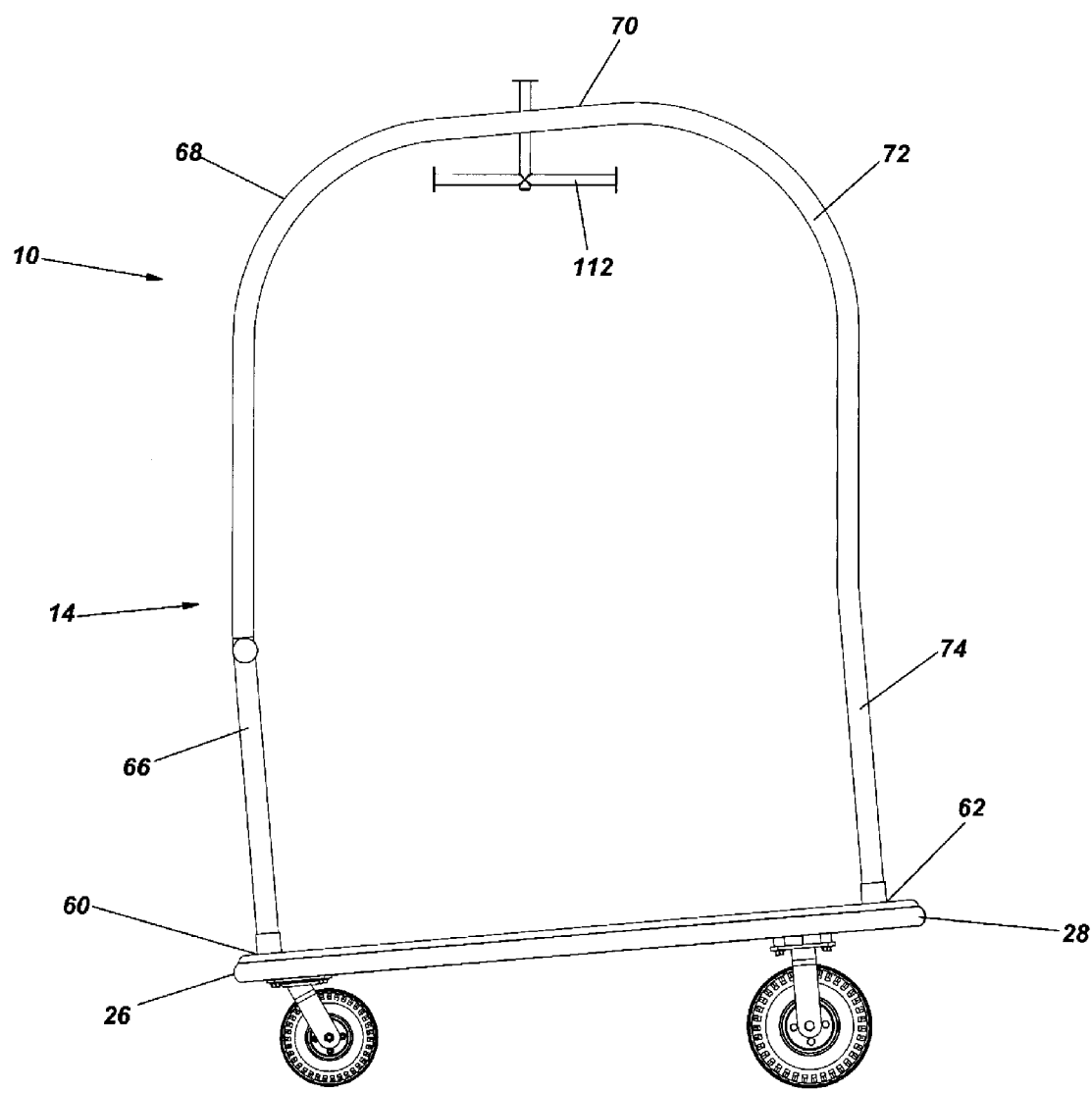
FIG. 7 is a right side view of the nestable luggage cart.
Figure 8:
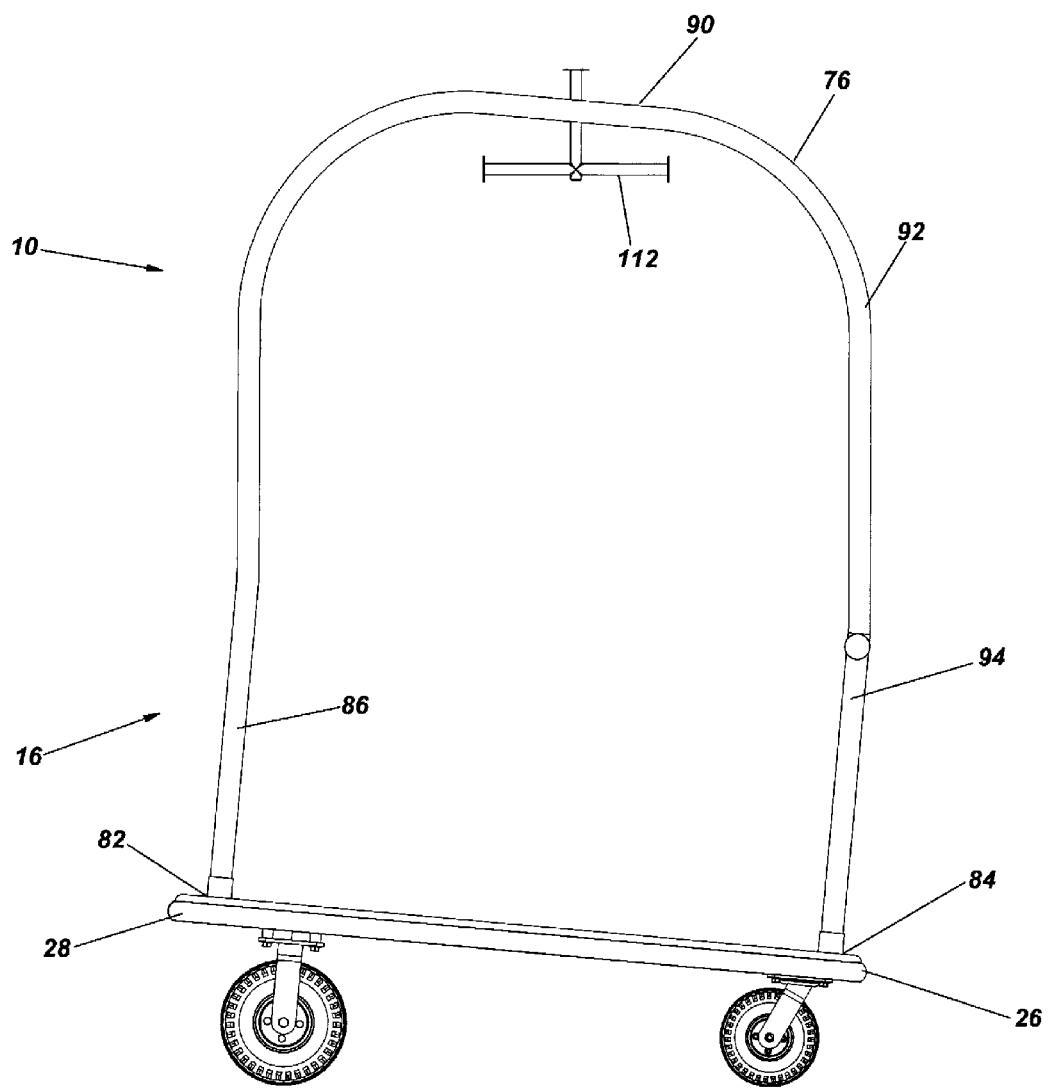
FIG. 8 is a left side view of the nestable luggage cart.
Figure 9:
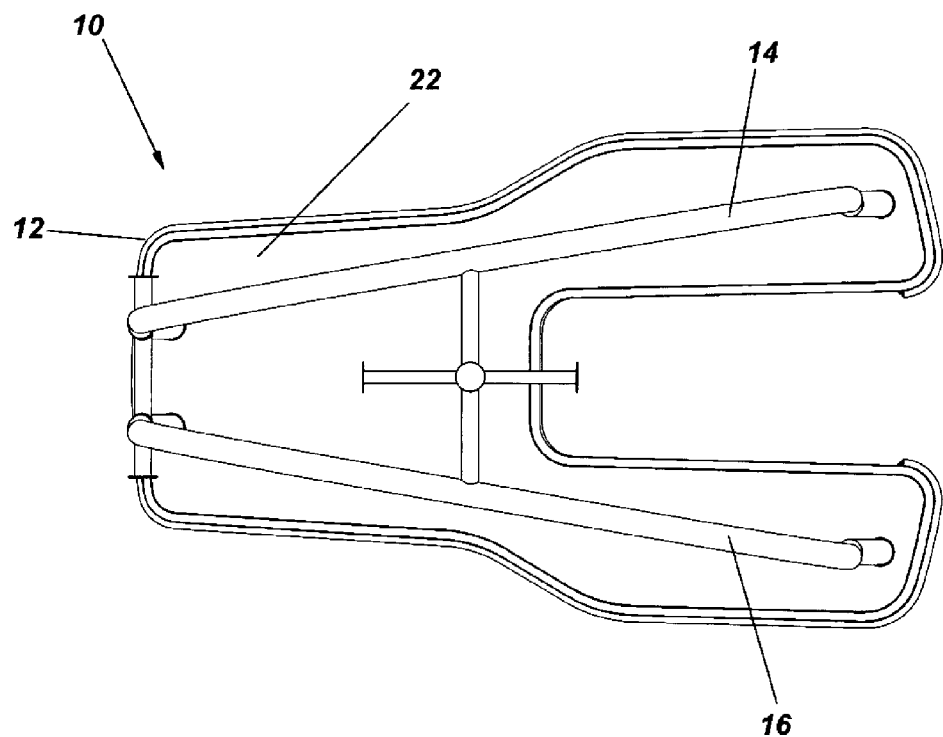
FIG. 9 is a top view of the nestable luggage cart.
Figure 10:
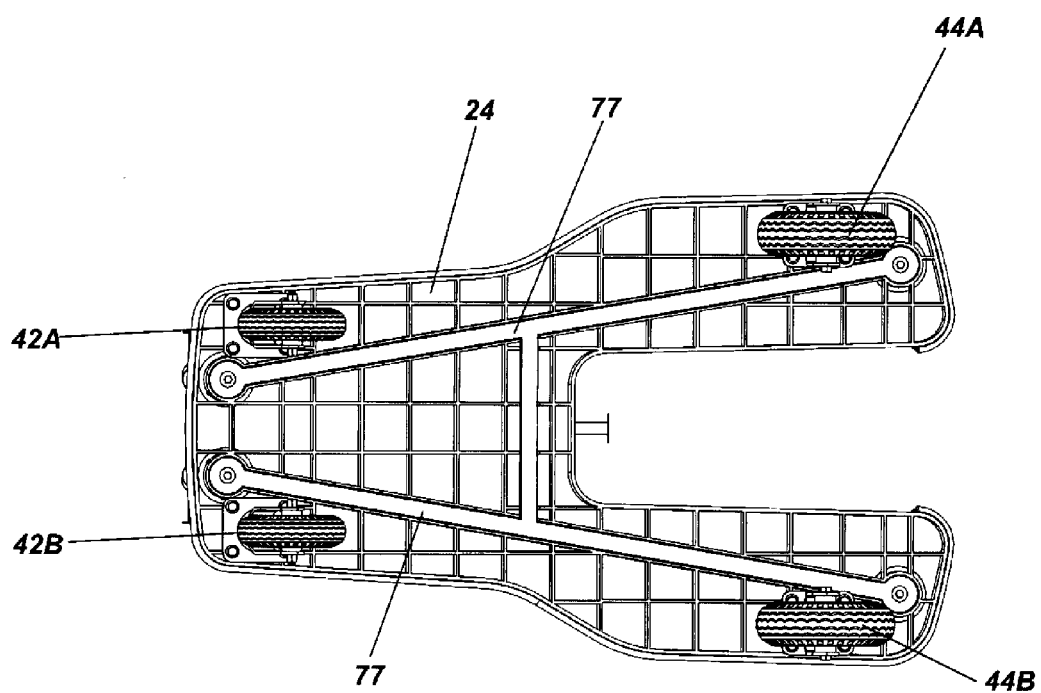
FIG. 10 is a bottom view of the nestable luggage cart.
Figure 12:
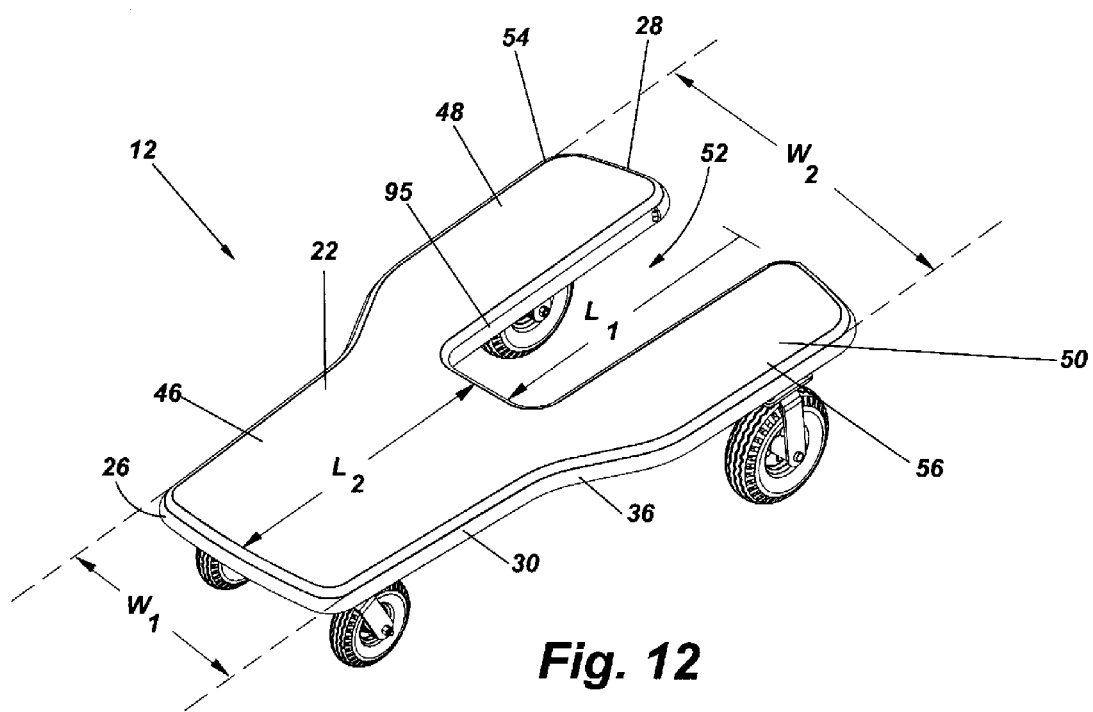
FIG. 12 is a perspective view of the nestable luggage cart platform.

The platform 12 contains an upper surface 22, see for example FIGS. 2 and 12, and a lower surface 24, see FIGS. 5 and 6. The platform 12 contains a first end 26, a second opposing end 28, and two opposing sides, 30 and 32, see FIGS. 2, 12 and 13. The first end 26 may be termed as a forward end; the second opposing end 28 may be termed as a rear end. The use of "forward end 26" and "rear end 28" is used primarily for reference purposes and describe the direction in which the luggage cart 10 is travelling. Typically, a luggage cart 10 is pushed so that the forward end 26 is facing the direction in which the luggage cart 10 is travelling. Luggage carts 10 may also be pulled by a user, in which case the reference to forward end and rear end would be reversed with regards to the individual moving the luggage cart 10. A bumper 36 can be placed on the perimeter of the platform 12 to prevent damage to the platform 12, and to prevent the luggage cart 10 from damaging walls or tables when being used to transport luggage or other times. The bumper 36 may be made of a plastic or rubber material, such as a rigid or high impact vinyl, a thermo plastic rubber, a neoprene or natural rubber blend, an extruded rubber, or molded urethane.

The platform 12 is carried on the plurality of wheels 18, 20 so that the platform 12 is raised above a surface and can be moved from one location to another location. The first wheel set 18 may comprise two forward end wheel castors 38A and 38B secured to the bottom surface 24 of the platform 12, see FIG. 3. The second wheel set 20 may comprise two rear end wheel castors 40A and 40B. The two rear end wheel castors 40A and 40B are secured to the bottom surface 24 of the platform 12 towards the rear end 28 and spaced apart from the forward end wheel castors 38A and 38B. The two forward end wheel castors 38A and 38B are preferably swivel castors, but may be rigid casters. The two rear end wheel castors 40A and 40B are preferably rigid castors, but may be swivel castors. While the platform 12 is described as being supported by castor wheels, other wheels or wheel assemblies may be used to move the luggage cart 10 directionally from one position to another. Wheels 42A and 42B of castors 38A and 38B may have a smaller diameter or wheel, or tread width, or both a smaller diameter and a smaller wheel/tread width than wheels 44A and 44B of castor 40A and 40B.

The platform 12 is configured to hold and transport various goods, as well as aid in nesting multiple, like-shaped luggage carts 10. The first or forward end 26 is configured to nest a like-shaped luggage cart 10. The second or rear end 28 is configured to receive and engage at least a portion of a like-shaped luggage cart 10. The luggage cart 10 is configured to comprise a first portion which has a smaller dimension than a second portion. As illustrated in FIG. 12, the width, $W_1$, of the first or forward end 26 is smaller than the width, $W_2$, of the second or rear end 28.

The platform 12 uses a primary transporting surface 46 for receiving and holding various goods, and two additional surfaces, 48 and 50, sized and shaped for holding various goods. Surfaces 48 and 50 are separated by a luggage cart nesting site, illustrated herein as a cut out region 52. The cut out region forms two arm-like extensions, a first arm 54 and a second arm 56. The length, $L_1$, of the cut out region 52 is preferably the same as the longitudinal length, $L_2$, of the primary transporting surface 46. Platform 12 preferably comprises a sloping surface. Preferably, the sloping surface is a downwardly sloping surface from the opposing second end 28, down towards the first end 26. The downwardly sloping surface may include the area below the first arm 54 and second arm 56, down towards the first end 26.

The first push/pull handle 14 and the second push/pull handle 16 are configured to aid in moving the luggage cart 10 from one position to another position, provide additional storage areas, and to aid in nesting multiple, like-shaped luggage carts 10. Push/pull handle 14 comprises a bar 58 having a first end 60 and a second opposing end 62. The first end 60 secures to a portion of the primary transporting surface 46 at point or opening 64. The second opposing end 62 secures to a portion of the first arm 54 at point or opening 66. In this configuration, the bar 58 extends the entire length of the platform 12. A first vertical portion 66 of the bar 58 extends upwardly from the upper surface 22. At bend 68, the vertical portion becomes a generally horizontal portion 70 (with reference to upper surface 22). A second bend 72 provides for the bar 58 to provide a second vertical portion 74. The second vertical portion 74 extends upwardly from the upper surface 22. Preferably, the bar 58 is made of a single unit. However, each of the portions, the first vertical portion 66, the horizontal portion 70, and the second vertical portion 74, may be constructed independently and secured together. Bar 58 is secured to the lower surface 24 through support structure 77 with screws 79A and washers 79B.

Push/pull handle 16 comprises a bar 76 having a first end 78 and a second opposing end 80. The first end 78 secures to a portion of the primary transporting surface 46 at a point or opening 82. The second opposing end 80 secures to a portion of the second arm 56 at a point or opening 84. In this configuration, the bar 76 extends the entire length of the platform 12. A first vertical portion 86 of the bar 76 extends upwardly from the upper surface 22. At bend 88, the vertical portion 86 becomes a generally horizontal portion 90 (with reference to upper surface 22). A second bend 92 provides for the bar 76 to provide a second vertical portion 94. The second vertical portion 94 extends upwardly from the upper surface 22. Preferably, the bar 76 is made of a single unit. However, each of the portions, the first vertical portion 86, the horizontal portion 90, and the second vertical portion 94, may be constructed independently and secured together. Bar 76 is secured to the lower surface 24 through support structure with screws 79A and washers 79B (see FIG. 5).

The first vertical portion 66 of bar 58 and the first vertical portion 86 of bar 76 are orientated to be in a generally parallel arrangement. The second vertical portion 74 of bar 58 and the second vertical portion 94 of bar 76 are orientated to be in a generally parallel arrangement. To aid in nesting, the distance $D_1$ between the second vertical portion 74 of bar 58 and the second vertical portion 94 of bar 76 is larger than the distance $D_2$ between the first vertical portion 66 of bar 58 and the first vertical bar 86 of bar 76. The orientation of the two bars 58 and 76 provides a clearance for nesting of like-shaped luggage carts 10. The distance $D_2$ is also a length that is smaller than the distance $D_3$ between wall 95 and 97. The length of distance $D_3$ also defines the size of opening 52.

Figure 11:
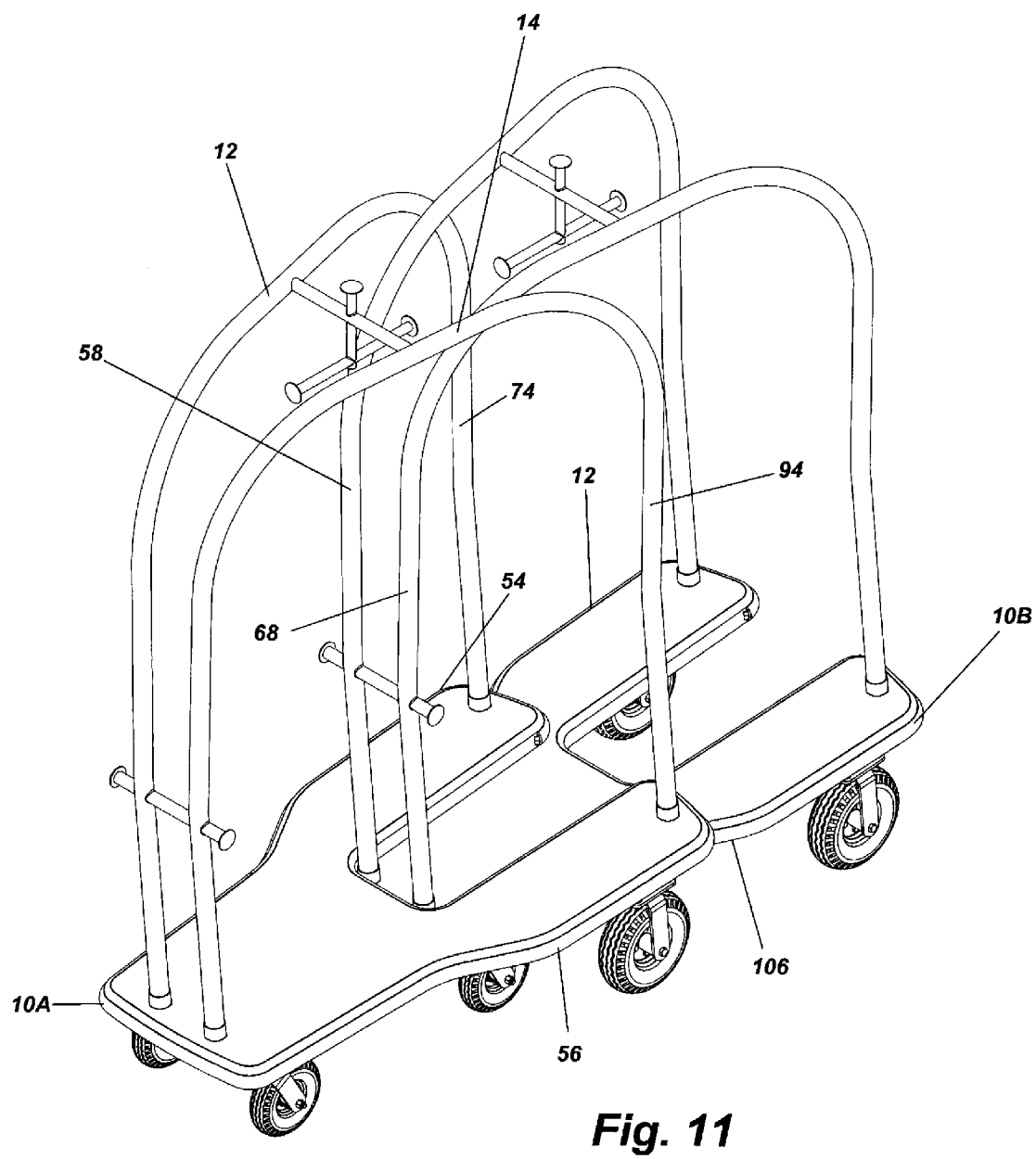
FIG. 11 is a perspective view of two nestable luggage carts nested together.
Figure 13:
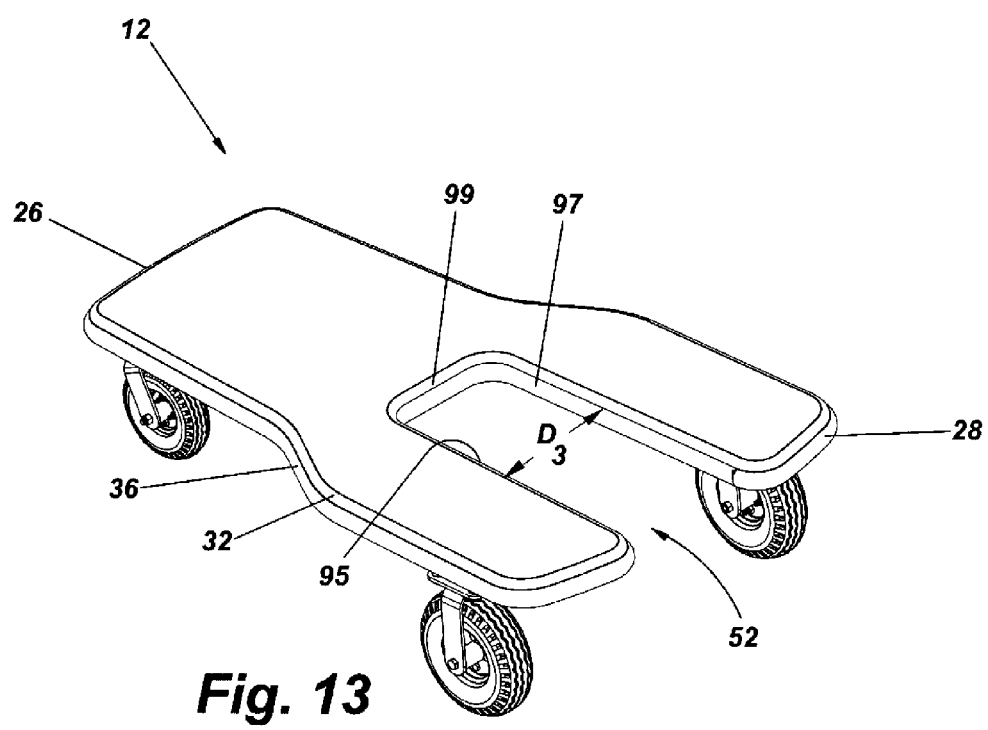
FIG. 13 is an alternative perspective view of the nestable luggage cart platform.

Referring to FIG. 11, like shaped luggage carts 10, individually referred to as 10A and 10B, are shown in a nested position. The platform 12 of luggage cart 10B is inserted within the opening 52 of luggage cart 10A and in between the second vertical portions (74, 94) of push/pull bars 14 and 16 of luggage cart 10A. The distance $D_1$ between the second vertical portions (74, 94) of push/pull bars 14 and 16 of luggage cart 10B allows the first vertical portions 66, 86 of luggage cart 10A to fit without hindrance. In the inserted position, the first vertical portions 66, 86 of luggage cart 10B rest against a backstop, a back wall 99 (FIG. 13). Since at least a portion of the platform of luggage cart 10B has a downward sloped surface, when nested, a portion of the platform 12 rests underneath first arm 54 and second arm 56. To further aid in proper nesting, the sides 30 and 32 of platform 12 may contain curved surfaces 100 and 102 (see FIGS. 1 and 2) which contain a stop edge 104, 106. As shown in FIG. 11, first arm 54 and second arm 56 of luggage cart 10A rest against stop edges 104, 106, preventing further movement of luggage cart 10A.

Figure 14:
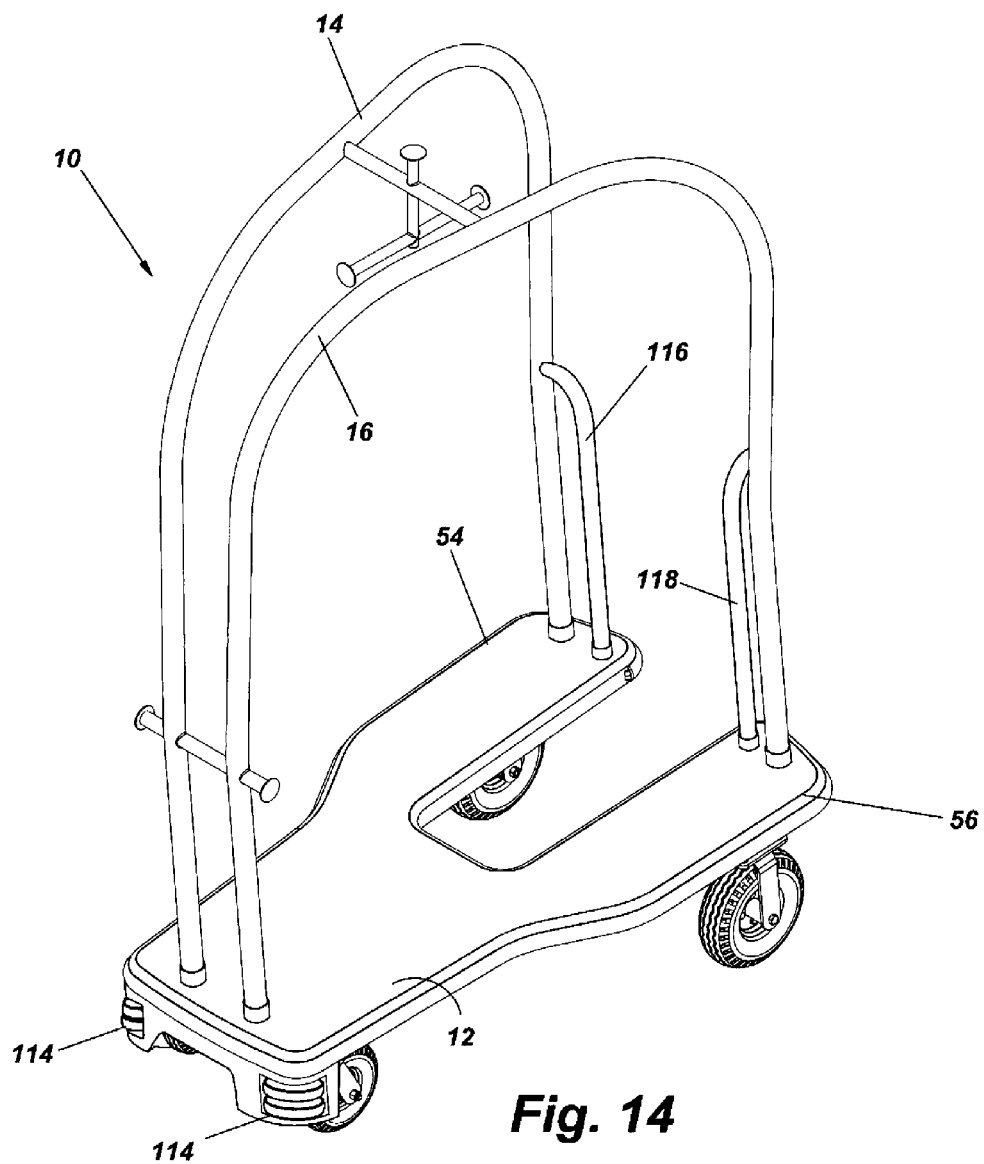
FIG. 14 is a perspective view of the nestable luggage cart illustrating additional features.

To aid in transporting luggage and other goods, the luggage cart 10 may include additional hang bars. A hang bar 108 connects the first vertical portion 66 of bar 58 and the first vertical portion 86 of bar 76. A second hang bar 110 connects the horizontal portion 70 of bar 58 and the horizontal portion 90 of bar 76. A third hang bar 112 is connected to the second hang bar 110 and extends away therefrom. In addition to providing an area to hold items such as clothes, hang bars may also provide stability. Referring to FIG. 14, the platform 12 may also include a guide member, illustrated herein as wheels 114. Wheels 114 may be used to guide the luggage cart 10 away from obstacles, such as walls. Wheels 114 may also be used to prevent damage from accidental contact to such obstacles. Bars 116 and 118 extending out from the second vertical portions (74, 94) of push/pull bars 14 and 16 and securing to arms 54 and 56 may be used to prevent items stored thereon from falling off during transportation.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A nestable cart comprising:
a platform configured to carry a load having a first end having a generally planar surface configured to support said load and sized and shaped to nest within a first portion of a like-shaped cart, a second end having a cut-out region extending inwardly toward a center, said cut-out portion separating said planar surface at said second end into a first portion and a second portion, said cut-out region configured to receive and engage with at least a second portion of said like-shaped cart;
a first push or pull handle having a first end secured to said first end of said platform, a second end secured to said second end of said platform, and a main body traversing between said first end and said second end;
a second push or pull handle having a first end secured to said first end of said platform, a second end secured to said second end of said platform, and a main body traversing between said first end and said second end, said second push or pull handle being spaced apart from said first push or pull handle, said first push or pull handle and said second push or pull handle having the same length to traverse between said first end and said second end but diverging at a point along said length, thereby having a distance between said first push or pull handle and said second push or pull handle that is larger at one end; and
a plurality of wheels attached to a lower surface of said platform.

2. The nestable cart according to claim 1 wherein said platform includes a sloping surface.

3. The nestable cart according to claim 1 wherein said platform further includes at least a portion of said first end having a smaller width than at least a portion of said second end.

4. The nestable cart according to claim 1 wherein said platform second end cutout comprises a generally U-shaped opening.

5. The nestable cart according to claim 4 wherein said second end of said first push or pull bar is secured to said second end of said platform at a distance from said opening.

6. The nestable cart according to claim 4 wherein said second end of said second push or pull bar is secured to said second end of said platform at a distance from said opening.

7. The nestable cart according to claim 1 wherein said plurality of wheels includes a pair of wheels secured to said lower surface of said platform at or near said first end.

8. The nestable cart according to claim 7 wherein said plurality of wheels includes a second pair of wheels secured to said lower surface of said platform at or near said second end.

9. The nestable cart according to claim 1 wherein the distance between a portion of said first push or pull handle and a portion of said second push or pull handle located at said platform first end is smaller than the distance between a portion of said first push or pull handle and a portion of said second push or pull handle located at said platform second end.

10. The nestable cart according to claim 1 further including at least one hang bar secured to at least a portion of said first push or pull handle and at least a portion of said second push or pull handle.

11. The nestable cart according to claim 1 further including a bumper.

12. The nestable cart according to claim 1 further including a guide wheel.

13. The nestable cart according to claim 1 wherein said platform has a sloped portion.

14. A nestable cart comprising:
a platform configured to carry a load having a forward end having a primary transporting surface for receiving and holding one or more items, and sized to nest within a like-shaped cart, a rear end having a cut-out region extending inwardly toward a center and forming two secondary surfaces separated by a distance and configured to receive and hold items, said cut-out portion sized and shaped to engage with at least a portion of said like-shaped cart;
a first push or pull handle having a first portion secured to said forward end of said platform, a second portion secured to said rear end of said platform, and a main body separating said first portion and said second portion; and
a second push or pull handle having a first portion secured to said forward end of said platform, a second portion secured to said rear end of said platform, and a main body separating said first end and said second end,
said first push or pull handle and said second push or pull handle having the same shape and length to traverse between a first position at or near said forward end and a second position at or near said rear end, and being separated from each other by a distance, said distance between said first push or pull handle and said second push or pull handle at said forward end is smaller than said distance between said first push or pull handle and said second push or pull handle at said rear end.

15. The nestable cart according to claim 14 further including a plurality of wheels attached to a lower surface of said platform.

16. The nestable cart according to claim 15 further including a guide wheel.

17. The nestable cart according to claim 14 wherein said platform has a sloped surface.

18. The nestable cart according to claim 14 further including a bumper.

* * * * *